United States Patent
Le et al.

(10) Patent No.: US 7,721,012 B2
(45) Date of Patent: May 18, 2010

(54) REPROGRAMMABLE DEVICE ADDRESS FOR A SERIAL INTERFACE IN AN OPTIC MODULE

(75) Inventors: Mike Le, Huntington Beach, CA (US); Keith R. Jones, Laguna Niguel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 221 days.

(21) Appl. No.: 11/337,186

(22) Filed: Jan. 18, 2006

(65) Prior Publication Data

US 2007/0166041 A1 Jul. 19, 2007

(51) Int. Cl.
*G06F 3/00* (2006.01)
*H04B 10/00* (2006.01)

(52) U.S. Cl. .......................................... 710/8; 398/135
(58) Field of Classification Search ...................... 710/8; 398/135

See application file for complete search history.

(56) References Cited

U.S. PATENT DOCUMENTS

| | | | |
|---|---|---|---|
| 4,534,064 A | 8/1985 | Giacometti et al. | |
| 5,019,769 A | 5/1991 | Levinson | |
| 5,383,046 A | 1/1995 | Tomofuji et al. | |
| 5,383,208 A | 1/1995 | Queniat et al. | |
| 5,396,059 A | 3/1995 | Yeates | |
| 5,594,748 A | 1/1997 | Jabr | |
| 5,812,572 A | 9/1998 | King et al. | |
| 6,108,113 A | 8/2000 | Fee | |
| 6,111,687 A | 8/2000 | Tammela | |
| 6,282,017 B1 | 8/2001 | Kinoshita | |
| 6,366,373 B1 | 4/2002 | MacKinnon et al. | |
| 6,452,719 B2 | 9/2002 | Kinoshita | |
| 6,941,077 B2 | 9/2005 | Aronson et al. | |
| 6,952,531 B2 | 10/2005 | Aronson et al. | |
| 6,957,021 B2 | 10/2005 | Aronson et al. | |
| 2002/0149821 A1 | 10/2002 | Aronson et al. | |
| 2003/0128411 A1 | 7/2003 | Aronson et al. | |
| 2004/0047635 A1 | 3/2004 | Aronson et al. | |
| 2004/0136727 A1 | 7/2004 | Androni et al. | |
| 2005/0215090 A1 | 9/2005 | Harwood | |
| 2006/0093365 A1* | 5/2006 | Dybsetter et al. | 398/135 |
| 2006/0108501 A1* | 5/2006 | Draper et al. | 250/205 |
| 2006/0108510 A1* | 5/2006 | Draper et al. | 250/214.1 |
| 2006/0239690 A1* | 10/2006 | Dybsetter et al. | 398/135 |

* cited by examiner

*Primary Examiner*—Henry W. H. Tsai
*Assistant Examiner*—Hyun Nam
(74) *Attorney, Agent, or Firm*—Weide & Miller, Ltd.

(57) ABSTRACT

An optic module is disclosed having a shared bus interface, a transmit disable line, a memory and control logic or a processor configured to facilitate address modification via a bus shared by multiple optic modules. A single housing may contain multiple modules, all of which are preferably accessible via a shared host via a shared bus. Standard compliant modules share a common address, which inhibits communication with only a particular optic module, via the shared bus, in a housing containing multiple optic modules. Using a common message to all modules to treat a transmit disable line as a module select line, a single module may be active during an address re-write operation. This process may repeat until all the modules within the housing have unique addresses.

17 Claims, 5 Drawing Sheets

REPROGRAMMABLE DEVICE ADDRESS FOR A SERIAL INTERFACE IN AN OPTIC MODULE

FIELD OF THE INVENTION

The invention relates to optic modules, and in particular, to a programmable or re-programmable addressing of optic modules.

RELATED ART

Optic modules are utilized to perform communication over optic channels. These modules are often expensive and relied upon for important data communication. In other situations or in the future, optic modules may be utilized in consumer applications in addition to communication infrastructure in which such modules are currently used. In all environments, module failure is undesirable and as such, optic modules are often configured with monitoring or diagnostic capability. This provides for monitoring of one or more of the outputs, inputs or other factors, such an environment, the concern the module.

To facilitate monitoring, the modules may be equipped with one or more monitoring elements and memory or other data storage elements. The modules may store system data, environment data, and threshold values. A processor and user interface may be provided to access the data values and control one or more aspects of the module. Monitoring in this manner provides for control over the optic module and may function to disable the module in the event a threshold value is exceeded. Likewise, a module may be shut down or the data re-routed to avoid data loss. An external host use may connect to the module to allow for user interface with the module.

As is commonly understood, multiple optic modules may be configured within a single enclosure or unit to service multiple optic fibers. This reduces space consumption, and allows for use of shared resources, such as power supplies and rack slots.

Although multiple optic modules may be located within a single enclosure or unit, one drawback to prior art system is that each optic module, if configured in accordance with the standard governing optic modules has the same address. The current standard governing optic modules comprises SFF-8472. Stated another way, for the optic module to be standard compliant, which is often a required characteristic, it must be addressed in the exact manner specified in the standard. When multiple optic modules are located within a single enclosure or module, this limitation may undesirably hinder efficient communication between a host and with the modules.

FIG. 1 illustrates a block diagram of a prior art standard compliant multi-module enclosure configured for communication with a host controller. In this embodiment, a host controller 104A, 104B, . . . 104N is associated with each optic module 108A, 108B, . . . 108N, where N may represent any whole number. A host 104 communicates with a module 108 via a two wire interface 110A, 110B, . . . 110N. As shown, the optic modules are enclosed within a single enclosure 120 or housing.

As a drawback to prior art configurations, use of the same address by each module 108, prevents module specific addressing from a shared or common host 104. Because each module is assigned the same address, attempts to utilize a shared bus result in a shared host reading from or writing to every module, even though the intent was to write to single specific module.

Although possible solutions to this drawback have been proposed, such solutions are viewed as undesirable. One such possible solution is to utilize a separate host for each module, such as shown in FIG. 1. As can be appreciated, this solution is not cost or space effective since a host must be associated with each module. Another solution is to have a technician physically disconnect a shared host from a first module to a second module to allow communication with the second module. Likewise, a technician may physically actuate an external switch that interconnects the various modules to the shared host. Although these options are possible options, it is clear that in reality these are not a desirable or economically options.

SUMMARY

To overcome the drawbacks of the prior art, a method for modifying an address of two or more optic modules is disclosed. In this example method, the method functions in connections with a host and two or modules. In this embodiment the host is connected to a first module and a second module via a shared two line path. In addition, the host connects to the first module via a first transmit disable path and to the second module via a second transmit disable path. The method sends a first command to the first module and the second module via the shared two line path. As a result, the first and second modules receive the first command. Responsive to the first command, the modules modify operation of the first module and the second module to react to signals received by the first module and the second module via a transmit disable path as instructions to enable or disable module communication with the host. Thereafter, the host sends a disable signal from the host to the second module via the second transmit disable path thereby disabling communication via the shared two line path between the second module and the host. The method then sends an address change signal to the first module from the host via the shared two line path to thereby change the address of the first module.

In one embodiment the method further comprising the steps of sending an enable signal from the host to the second module via the second transmit disable path thereby enabling communication via the shared two line path between the second module and the host. Then, sending a second command to the first module and the second module via the shared two line path and receiving the second command at the first module and the second module. The method also, responsive to the second command, modifies operation of the first module and the second module to react to signals received by the first module and the second module via a transmit disable path as instructions to restore operation of the first transmit disable path and the second transmit disable path to a default mode.

In one embodiment the method further comprises sending a disable signal from the host to the first module via the first transmit disable path thereby disabling communication via the shared two line path between the first module and the host. The method next sends an enable signal from the host to the second module via the second transmit disable path thereby enabling communication via the shared two line path between the second module and the host. The method sends an address change signal to the second module from the host via the shared two line path to thereby change the address of the second module. The host then sends a second command to the first module and the second module via the shared two line path and the module receives the second command at the first module and the second module. Responsive to the second command, the method modifies operation of the first module and the second module to react to signals received by the first module and the second module via a first transmit disable path and second transmit disable path as instructions to restore operation of the first transmit disable path and second transmit disable path to a default mode.

It is contemplated that the host may comprise a personal computer. In one example method of operation, the method changes the address of all but one optic modules out of the group of two or more optic modules. In one embodiment the disable signal disables a module interface found within the module that connects to the two line path. It is possible that the method allow two or more modules to be assigned unique addresses to thereby provide for communication from a host to two or more modules via the shared two line path.

Also disclosed herein is an optic module comprising an optical transceiver configured to transmit and receive optic signals. Also part of the optic module is a two line interface configured to connect to a host via a two line path and a control line input configured to connect to the host and receive control data from the host. This embodiment also includes one or more memory elements configured to store a module address and a control line status data. Control logic is provided and configured to set control line status data. In this embodiment the control logic is further configured to detect the state of the control line status data and responsive to the state of the control line status data disable operation of the two line interface which in turn disables the module interface.

In one embodiment the control line comprises a transmit disable line. The control line status data may comprise a single bit. It is contemplated that the module may be one of two or more similarly configured modules contained within a single housing that connects to the host and all of the two or more modules connect to the host via the two line path. In one configuration the control logic comprises a processor configured to detect the state of the control line status data and, responsive to the state of the control line status data, disable operation of the two line interface which disables communication between the module and the host via the two line path.

Also disclosed herein is an optic module assembly comprising a housing configured to create an interior space within the housing and two or more optic modules contained within the interior space of the housing such that each module may be configured with a common address or a module specific address. A shared bus connects to each optic module within the housing such that the shared bus is also configured to connect to a shared host. This embodiment includes a transmit disable line associated with each optic module. In this configuration the transmit disable line connects to each optic module and to the shared host. In this embodiment the address of each optic module may be changed from a standard address to a unique address by selectively enabling, through use of the transmit disable line, only a single module within the housing for an address re-write operation via the shared bus.

In one embodiment each optic module is configured with a different address, thereby allowing the host to communicate with a particular optic module utilizing that particular different optic module address. It is contemplated that each optic module may further comprise memory configured to store a module address and transmit disable line status. In one embodiment the transmit disable line status comprises a register value that controls if a module may communicate via the shared bus. Also possibly part of this embodiment is a shared bus interface configured to facilitate communication with the optic module over the shared bus and wherein the shared bus interface is configured to be disabled responsive to a signal sent via the transmit disable line. Likewise, each optic module may further comprise memory and the host may comprise a personal computer configured to read and write to a particular optic module memory via the shared bus using a unique address associated with a particular optic module.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
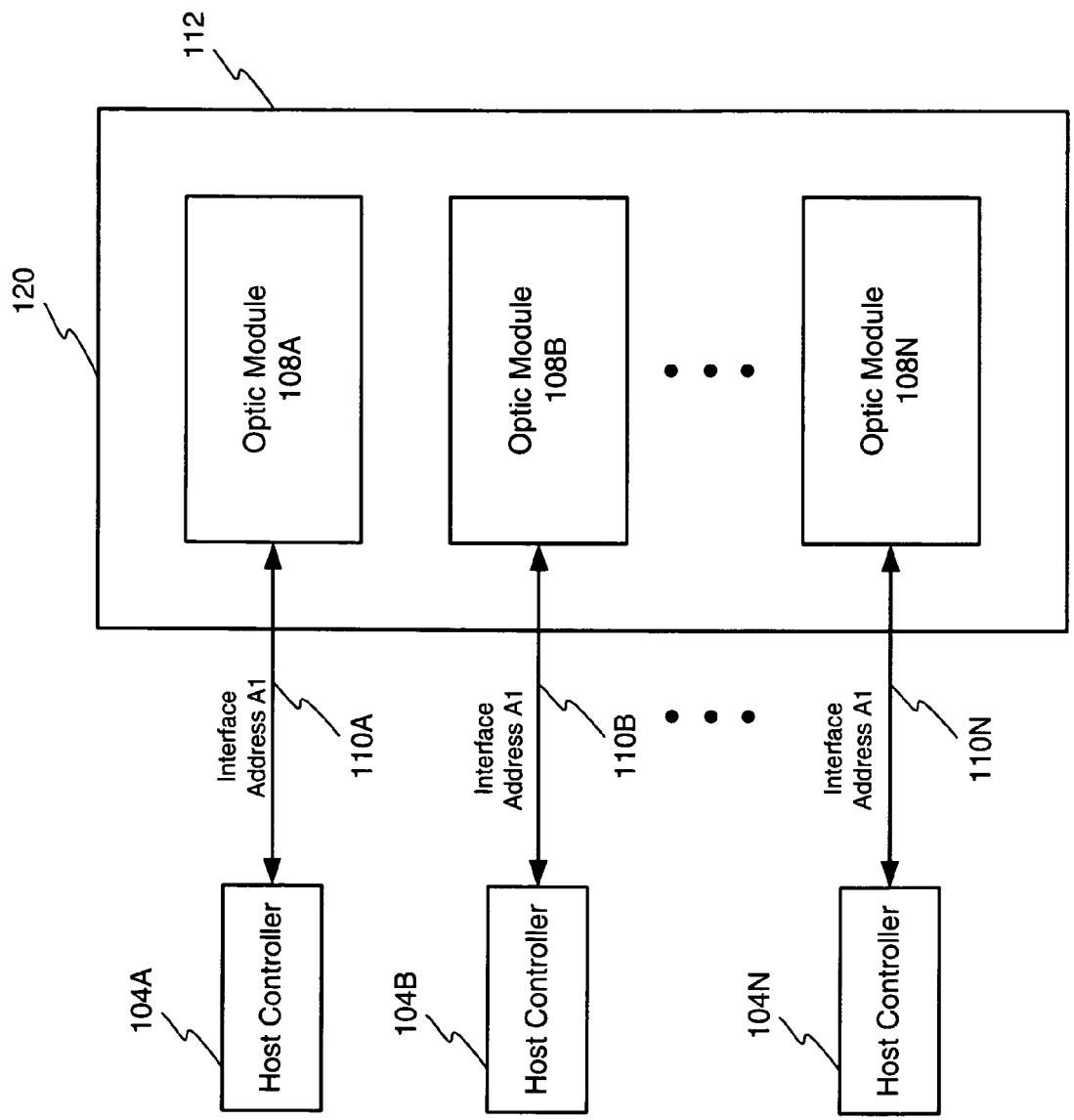
FIG. 1 illustrates a block diagram of a prior art module to host connection configuration.
Figure 2:
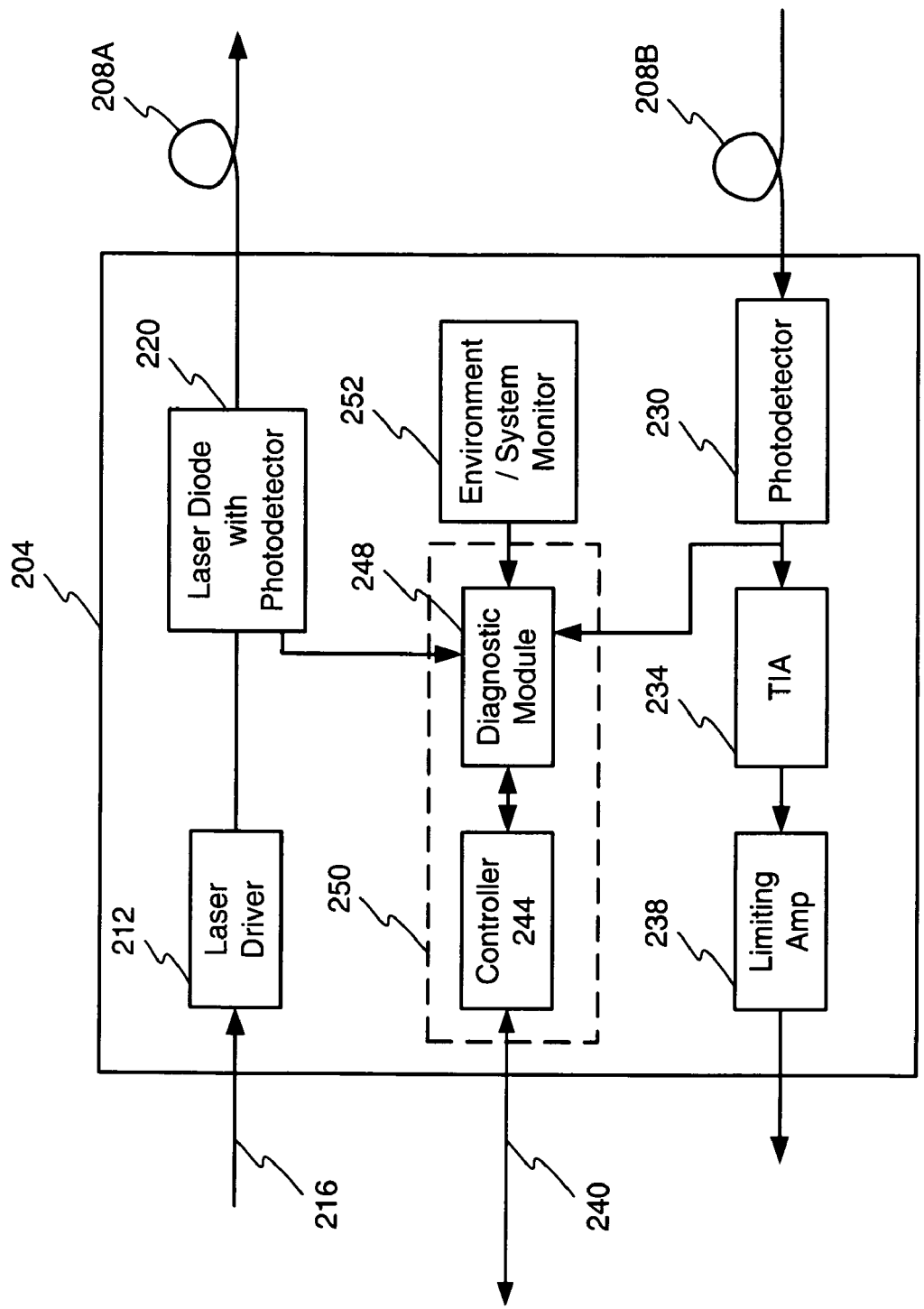
FIG. 2 illustrates a block diagram of an example environment of use.

FIG. 1 illustrates a block diagram of an example environment of use for the method and apparatus disclosed herein. This example embodiment comprise an optic module 204 as may be configured to communicate over optic fiber 208A, 208B. In general, the module 204 may be considered for purposes of discussion as a transmitter, shown at the top of the figure within the module 204, and a receiver, shown at the bottom of the module. A control and monitoring system 250, 252 is shown generally between the transmitter and receiver and may be considered as shared between the transmitter and receiver portion of the module 204. Although not shown, additional processing, gating, buffering, or other elements may be associated with the module 204.

In this example embodiment the transmitter comprises a laser driver 212 configured to receive one or more incoming signals on one or more data inputs 216. The laser driver 212 converts an incoming voltage level, representing an outgoing data signal, to an electrical current suitable for driving an optic signal generating device, such as laser diode 220. The laser driver 212 may map the incoming data signal into an electrical current having parameters, namely bias current and modulation current to facilitate driving any optic generator, such as diode 220.

It is contemplated that the optic signal generator 220 may include a photo detector capable of generating an output that represents one or more aspects of the optic signal generator or the optic signal, such as power level or other factor for monitoring the generator or other purposes. One or more fibers 208A connect to the module 204 to receive the outgoing signal from the signal generator 220. Any type fiber 208 or other transmitter apparatus may be utilized.

Turning now to the receiver aspects of the module 204, one or more fiber 208B carrying incoming optic signals connect to a photo detector 230. The photo detector 230 converts the incoming optic signals to electrical signals, which are thereafter provided to a transimpedance amplifier 234 (TIA), which is capable of converting the low magnitude current signal from the detector 230 into a voltage value output signal. The output of the TIA 234 is forwarded to a limiting amplifier 238 which may serve as the final stage to set the signal level appropriate for additional processing. The output of the limiting amplifier 238 is output from the module 204 as an electrical signal at a desired voltage level.

The output from the photo detector 230, 220 may connect or be monitored by a diagnostic module 248 associated with the controller aspects of the module 204. This is discussed below in more detail.

Assisting with or monitoring one or more aspects of the module 204 are a controller and monitoring aspects 250, 252 of the module 204. In this embodiment a host (not shown) may communicate over a two wire interface path 240 with a controller 244. The controller 244 may comprise a processor, control logic, or any other element or device capable of performing as described herein. The controller 244 communicates with a diagnostic module 248, which may be configured into a single integrated circuit or ASIC. The diagnostic module 248, in connection with the controller 244, may perform monitoring of laser driver currents, photo detector currents, module power supply levels, in addition to but not limited to maintaining module status information to monitor and/or control one or more aspects of the module.

It is contemplated that the controller 244 and diagnostic module 248 may also be configured to control or dictate one or more modes or aspects of module operation. In one embodiment the module may conform with general application or specification SFF-8472, which comprises a multivendor agreement for providing digital diagnostic and monitoring of the optic module. SFF8472 is hereby incorporated by reference. The SFF8472 specifies an electrical interface, such as interface 240, as a two wire serial interface.

Memory may be associated with the controller 244 and/or diagnostic module 248 to store threshold information and/or current or past data regarding the module, module operation or module environment. The locations within the memory may be identified by an address and the module itself may be identified with an address.

One or more environment or system monitors 252 may communicate with the module 248 or controller 244 to provide information regarding the module, module environment or device behavior or operation. One example of such a monitoring device may be a temperature monitor.

Figure 3:
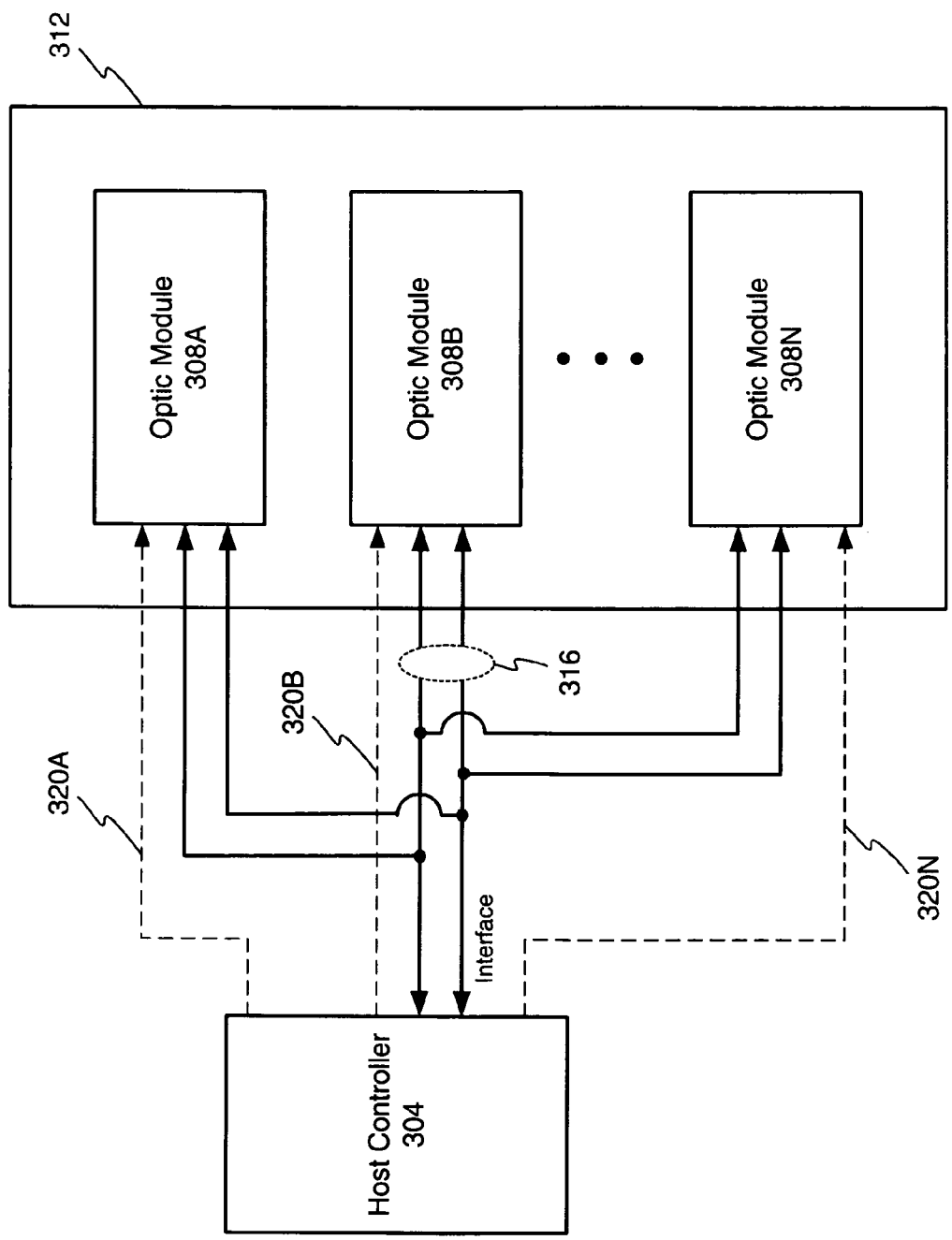
FIG. 3 illustrates an example embodiment of multiple optic modules controlled by a single host device.

FIG. 3 illustrates a block diagram of an example embodiment of multiple optic modules controlled by a single host device. By implementing the method and apparatus as described herein, a single host controller may communicate with multiple modules. In contrast to the configuration shown in FIG. 1, which requires a separate host for each optic module, the configuration of FIG. 3 is preferred.

As shown, a host 304 may comprise any devices capable of communicating with one or more optic modules 308A, 308B, 308N. The value of N may comprise any whole number. In one embodiment the controller 304 comprises a computer. The multiple modules 308 may be contained within a single housing 312 or within a single rack storage unit.

Connecting the host 304 to the modules 308 is a shared interface path or line 316. In this example embodiment the interface path comprise a two wire interface path, but in other embodiments other types of interfaces may be utilized. In this embodiment the interface 316 is a shared interface, thereby eliminating the need, when combined with a unique addressing scheme, for a separate host for each module. Also provided is a transmit disable line 320A, 320B, . . . 320N from the host 304 to each module 308A. In the embodiment described herein the transmit disable line 320 comprises a direct path or connection into each module (or integrated circuit within the module) that may be utilized to send a signal from the host to the module to disable operation of the module. This may be useful, during operation, to disable to signal generator during repair, reset, testing, or for any other reason. It is contemplated that the transmit disable signal may set a flag or bit in a register or in any other manner force the module to disable the signal generator or other element or aspect of operation.

In the embodiment of FIG. 3, the host 304 is configured to communicate with each module using a unique address assigned to an optic module 308. In one embodiment the optic modules are each assigned a unique address during manufacture, configuration, and are thus equipped, when installed, with a unique address. For example, the module may be configured with a different image stored in a memory, such as EEPROM. Then at start-up, the image is loaded from the memory to modify one or more addresses of data within the module, the module address, or both. While this may or may not be considered standard compliant, it overcomes the drawbacks of the prior art. When the host 304 intends to communicate with a particular module 308, it utilizes the modules address in the communication. Although all modules 308 may receive the message, only the module with the corresponding address will accept or act on the message. In one embodiment the module(s) appear as memory to the host, which may be accessed, written to, or interrogated. One type of data which may be stored on the module comprises device identification data. Examples of the type of device identification data that may be found in the module includes, but is not limited to, vendor ID, Part ID, Optic Link information, data rate, and wavelength. In addition, diagnostic information may also be found in the module, including, but not limited to supply voltage monitor values, temperature monitor values, transmit and receive optic power monitor values, modulation current values, and status flags. In one embodiment the address for the serial ID information is at address AOX and the diagnostic information is at A2X.

In standard compliant modules, all modules have the same addresses, which inhibits communication with only a particular module via path 316. Thus standard compliant devices all have or are equipped with the same address, which prevents use of a shared bus. As a result, in one embodiment, the optic module may be configured to selectively enable a module or module interface 316 based on another control signal from the host to the module. In one embodiment, the control signal that may temporarily disable a module's interface path 316 comprises a signal sent via the transmit disable line 320. When the interface aspects of all but one module 308 are disabled, the module with an active interface may receive a communication from the host that re-writes the module's address to a unique address. The process may sequentially occur with the other modules 308 until the all of the modules 308 within the enclosure are assigned unique addresses. Thereafter, each module 308 may be access or communicated with via the shared interface path 316 by a single host. This operation is discussed below in more detail.

Figure 4:
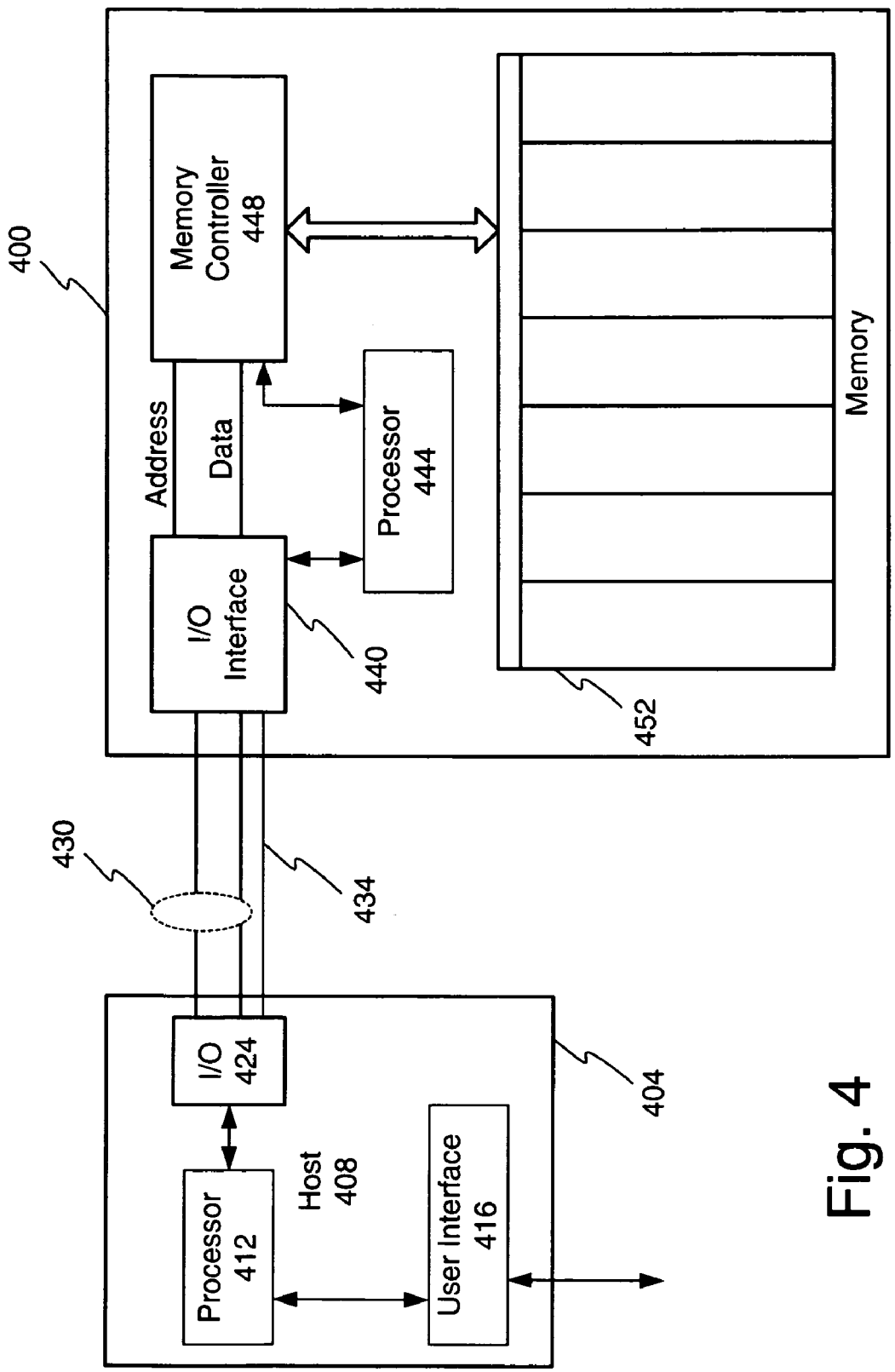
FIG. 4 illustrates a block diagram of an example host with associated optic module.

FIG. 4 illustrates a block diagram of an example host with optic module. This is but one example embodiment of a optic module equipped for unique address conversion to establish unique module addressing. After reading the description provided herein, one of ordinary skill in the art may devise other systems or methods for establishing a unique address, without departing from the scope of the claims that follow. As shown in FIG. 4, a host 408 may comprise a user interface 416 which may interface with a user of the host, such as a technician or other machine to control the host, which in turn may control or interrogate or interact with the modules 400. The user interface 416 may comprise any element capable of receiving input and providing information regarding the host, module, or both. One example of a user interface is a keyboard, mouse, and display.

The user interface 416 may interact with a processor 412. The processor 412 may interact with an input/output (I/O) 424 which is configured to communicate with a module 400. As referenced in FIG. 3, the I/0 may utilized a shared two wire interface path 430, which connects to other modules 400. This may be referenced as a shared path or a shared interface. Also connecting the host 404 and the module 400 is a control line 434, which in this example embodiment comprise a transmit disable line configured to conduct a transmit disable signal to the module 400. In other embodiments the control line may comprise a different path.

The two wire interface path 430 and the control line 434 connect to a module I/O interface 440 configured to achieve communication between the module 400 and the host 408. The interface 440 control and facilitate communication via paths 434, 430. Also part of the module 400 is a controller or processor 444, a memory controller 448, and one or more memory units 452. In this example embodiment, the interface 440 communicates with the memory controller 448 via an address line and a data line, as shown. The address line carries a particular memory address to the controller 448, while the data line carries data to the memory 542, via the controller 448. The interface 440 may also communicate with the processor 444.

The processor 444 may comprise any type processor, logic, control circuitry, or ASIC configured to perform as described herein. The processor 444 may control one or more aspects of the module 400 as would be understood. The processor 444 may be configured with internal memory (not shown) or utilized the memory 452 for storage of data, flag, or other information. The memory controller 448 may comprise any type control structure for writing information to or reading information from the memory 452. Operation of the module may occur as is understood by one of ordinary skill in the art.

For a module 400 to be standard compliant, the module is assigned a predetermined address. All standard compliant modules are assigned the same address. As can be appreciated, in the configuration of FIG. 3, attempting to communicate with a single particular module when all the modules share the same 15 address, is simply not possible. Accordingly, the method and apparatus described herein, and discussed below in relation to FIG. 4 overcomes this drawback.

In one example method of operation, the host 404 connects to the module via the two wire interface path 430 and the transmit disable line 434. Operation of the module may not yet have commenced at this stage, although installation may have occurred. In other embodiment, operation may have commenced.

In one embodiment, the host 408 sends a signal via the transmit disable path 434 to the module 400 to cause the module to enter into a reconfiguration state. The module 400 is configured with logic, software, hardware, or a combination of these elements to interpret this incoming control signal to enable to module to have the modules address re-written.

For example, the housing may contain four modules 400, each of which have a transmit disable line 434 connected to the host. The modules 400 are configured with logic or other means to identify when a control signal is being sent to the modules.

When a control signal is sent, such as the transmit disable line goes inactive, the module 400 enters a write mode allowing the two line interface to re-write the address for the module with a unique address. The host 404 may sequentially force only one transmit disable line (control line) high at a time thereby allowing the host to sequentially re-write the addresses for each of the modules with unique addresses.

In one embodiment, the signal on the transmit disable line sets a bit or flag in the module to an alternate state which signifies to the modules that the address for the module is to be re-written. For example, the module may be configured such that a high state or setting the transmit disable flag may disable the I/O interface for the module. If only one module that connects to the host is left with an active I/O, such as an active interface 440, then as a result, the host may re-write the address of this module without re-writing the addresses of the other modules also connected to the host. This process of selectively de-activating all of the I/O interfaces 440, except one, and re-writing the address with a unique address may be repeated until each of the modules has a unique address. In one embodiment, the module is not yet active, during the module address re-write process, and hence, operation is not disrupted. In other modes of operation, the module may be active, i.e. transmitting and/or receiving optic signals during the address change operation.

In one embodiment, an initial write operation is performed to a default address using the two line interface path. This write operation to each module, which may occur over the shared two line interface path, forces each module to interpret the transmit disable signal as a chip select instead of a signal to disable operation of the module. This write operation may comprise setting a flag or a registering bit. When a module is configured in this manner, the transmit disable line becomes the module select thereby allowing the state (high/low) of transmit disable line, or a signal on the transmit disable line, to control if a module may receive communication from the host. By enabling only a single module at a time, and disabling the other modules, the address of each module may be changed to a unique address.

After the host re-writes the address of each modules to a unique address, a signal is sent from the host to each module restoring the transmit disable path to its original function, namely, disabling operation of the module. This may occur by the module being sent a signal that reverses the effect original signal that changed the configuration of the transmit disable line, and/or by re-writing a memory location or register to return the transmit disable line to its function as a transmit disable line, instead of a module select line. In one embodiment a configuration bit is set to control the function of the transmit disable line. In this embodiment the function of the transmit disable line is controlled by a control line status bit, which may be controlled by the host via the two line interface. The module may be configured with a status bit register or a location in memory, that may be modified by the host to control the function of the control line, such as a transmit disable line.

In one embodiment, the memory controller 448, the I/O interface, or any other element performs an address indirection or modification from the address specified via the two line interface path 430. As a result, the address specified by the host via the two line interface may be processed to generate a different address. This provides the benefit of a more flexible address scheme, as compared to the standard compliant devices, and may provide for a greater range of memory allocation and expansion. In one embodiment a look-up table is utilized to select or convert memory addresses. In one embodiment a FIFO memory allocation unit with address tracking is utilized to assign memory locations different than that those specified by the host. In one embodiment an address translation table is utilized.

As shown, the interface 440 may be configured to provide a device address and a data address. The device address may define a particular IC, a device within the module. The data address may define a memory location.

Figure 5:
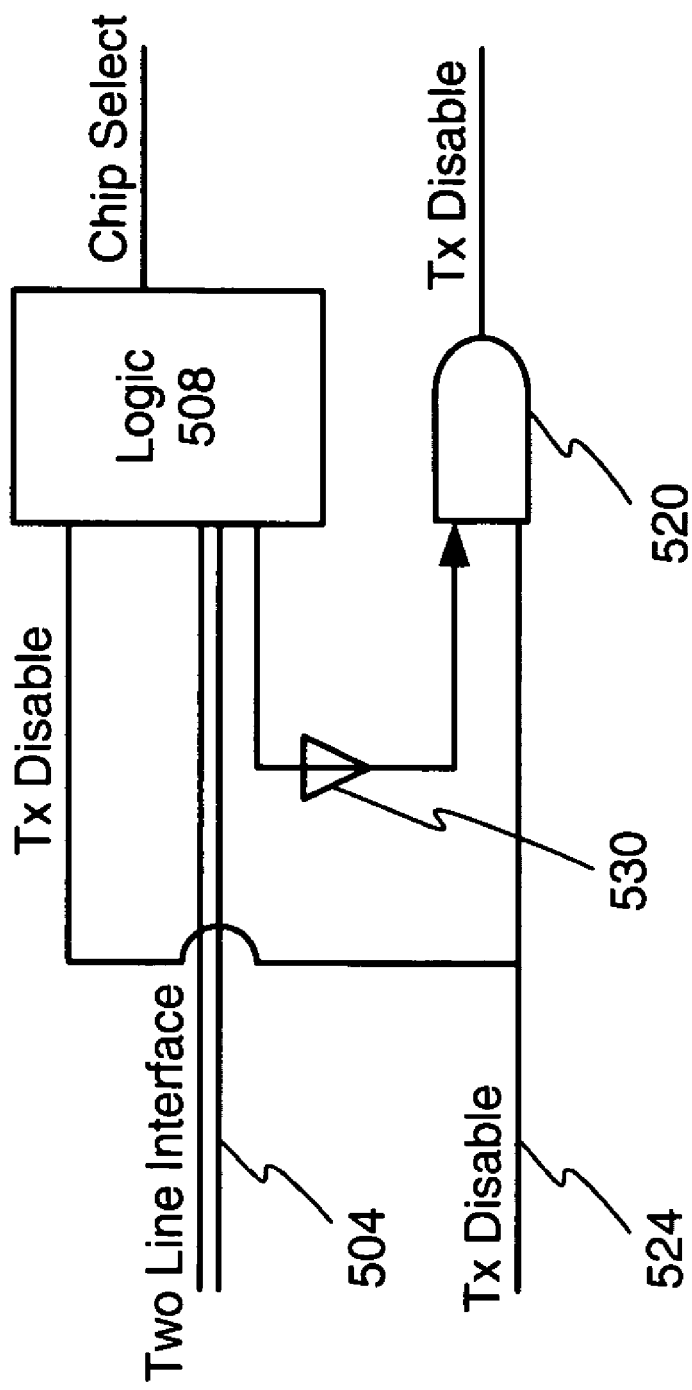
FIG. 5 illustrates an example embodiment of control system utilized to establish the control line as a module select.

FIG. 5 illustrates an example embodiment of control system utilized to establish the control line as a module select. This is but one possible example embodiment and as such, one of ordinary skill in the art may arrive at other configurations which do not depart from the scope of the claims. In this embodiment the two line interface path 504 may connect to logic 508, which may optionally be equipped with memory. The signal on the two line interface path 504 may set a memory location or other logic element in the logic 508 to thereby generate an output to the logic element 520. In the embodiment of FIG. 5, element 520 comprises a AND gate and the input to the AND gate may be inverted to facilitate proper operation. In one embodiment as shown, the tx disable line 524 also connects to the logic 508 which, when combined with the signal on path 540, forces the logic 508 to output a signal to element 520. However, in other embodiments the tx disable line 524 may not connect to the logic 508 and, as a result, only the signals on path 504 cause the logic to establish the output from the logic to the logic element 520.

The element 520, upon receiving only the transmit disable signal, treats the transmit disable input a signal instructing the module to shutdown or be disabled. In contrast, when the signal on the transmit disable path 524 and the signal from the logic 508 are both high, then the signal on the transmit disable path operates as a module select. It is contemplated that the logic 508 and logic element 520 may comprise any type logic, processor, ASCI, controller or any combination thereof that is capable of functioning as described herein. The elements 508 and 520 may comprise hardware, software, or a combination of both. A logic element In an alternative configuration, the combination of a particular two line interface signal via path 504 in combination with the transit disable signal on path 524 causes the logic 508 to generate a module select signal thereby either disabling the module or enabling the module or the modules two line communication path or interface. By generating a module select signal with the logic 508, a single module, from multiple modules connected to a host, may be activated at a particular time, thereby allowing the host to selectively change the address of a particular active module.

Operation of the system of FIG. 5 is now discussed. During operation a particular signal may be sent to the logic 508 via path 504 to set the logic or a status bit. This signal changes operation of the control line, such as the tx disable line. This may occur, for all the modules, at the same time, to thereby disable the tx disable line of all modules from functioning as a module disable line. Instead a signal sent via the transmit disable path functions as a module select line. Accordingly, all of the modules may then be disabled, except for one, which may be enabled.

The host may then change the address of the enabled module via path 504 by re-writing the address location with the new address. This may occur for each module to establish a unique address for each module.

After the one or more addresses for the modules are changed, the two line interface path 504 may send a signal to the logic which restores operation of the tx disable path as a path for signals to disable the module, instead of serving as a module select line to facilitate module address changes.

In one embodiment, to initiate the address change process, a command from the host to all of the modules is sent via the two line path. At this stage all the modules receive the command because all modules have the same address. The command instructs all modules to set a status bit or register value to enter a state wherein a signal on the transmit disable path may disable or enable the two wire communication interface of the module.

Using the transmit disable path in this manner allows the host to select a particular module while disabling all others, to change the address of that particular module. This process may be repeated. After all modules have had their address changed, all the modules interfaces may be enabled and a command may be sent from host to the modules to restore operation of the transmit disable path to default mode.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for modifying an address of two or more optic modules comprising:
    providing a host and two or modules, wherein the host is connected to a first module and a second module via a shared two line path and to the first module via a first transmit disable path and to the second module via a second transmit disable path;
    sending a first command to the first module and the second module via the shared two line path;
    receiving the first command at the first module and the second module;
    responsive to the first command, modifying operation of the first module and the second module to react to signals received by the first module and the second module via a transmit disable path as instructions to enable or disable module communication with the host;
    sending a disable signal from the host to the second module via the second transmit disable path thereby disabling communication via the shared two line path between the second module and the host; and
    sending an address change signal to the first module from the host via the shared two line path to thereby change the address of the first module.

2. The method of claim 1, further comprising the steps of:
    sending an enable signal from the host to the second module via the second transmit disable path thereby enabling communication via the shared two line path between the second module and the host;
    sending a second command to the first module and the second module via the shared two line path;
    receiving the second command at the first module and the second module;
    responsive to the second command, modifying operation of the first module and the second module to react to signals received by the first module and the second module via a transmit disable path as instructions to restore operation of the first transmit disable path and the second transmit disable path to a default mode.

3. The method of claim 1, further comprising:
    sending a disable signal from the host to the first module via the first transmit disable path thereby disabling communication via the shared two line path between the first module and the host;
    sending an enable signal from the host to the second module via the second transmit disable path thereby enabling communication via the shared two line path between the second module and the host;

sending an address change signal to the second module from the host via the shared two line path to thereby change the address of the second module.
sending a second command to the first module and the second module via the shared two line path;
receiving the second command at the first module and the second module; and
responsive to the second command, modifying operation of the first module and the second module to react to signals received by the first module and the second module via a first transmit disable path and second transmit disable path as instructions to restore operation of the first transmit disable path and second transmit disable path to a default mode.

4. The method of claim 1, wherein the host comprises a personal computer.

5. The method of claim 1, wherein the method changes the address of all but one optic modules out of the group of two or more optic modules.

6. The method of claim 1, wherein the disable signal disables a module interface found within the module that connects to the two line path.

7. The method of claim 2, wherein the method allows two or more modules to be assigned unique addresses to thereby provide for communication from a host to two or more modules via the shared two line path.

8. An optic module comprising:
An optical transceiver configured to transmit and receive optic signals;
a two line interface configured to connect to a host via a two line path, wherein the two line interface is configured to accept a module address change signal from a host via the two line path;
a control line input configured to connect to the host and receive a disable signal from the host;
one or more memory elements configured to store a module address and a control line status data;
control logic configured to set a control line status data responsive to the disable signal, wherein the control logic is further configured to detect the state of the control line status data, and responsive to the state of the control line status data reflecting receipt of the disable signal, then disabling operation of the two line interface which in turn disables the two line interface from processing a module address change signal.

9. The module of claim 8, wherein the control line comprises a transmit disable line.

10. The module of claim 8, wherein the control line status data comprises a single bit.

11. The modules of claim 8, wherein the module is one of two or more similarly configured modules contained within a single housing that connects to the host and all of the two or more modules connect to the host via the two line path.

12. The modules of claim 8, wherein the module address may be modified when the control line status data is set to not disable the two line interface.

13. The module of claim 8, wherein the control logic comprises a processor configured to detect the state of the control line status data and, responsive to the state of the control line status data, disable operation of the two line interface which disables communication between the module and the host via the two line path.

14. An optic module assembly comprising:
a housing configured to create an interior space within the housing;
two or more optic modules contained within the interior space of the housing, wherein each module is configured with a common address or a module specific address and each module has a shared bus interface, wherein a shared bus interface is capable of being enabled or disabled;
a shared bus connected to each optic module within the housing, wherein the shared bus is also configured to connect to a shared host and communicate an address change from the shared host to an optic module when the address change is sent from the shared host to an optic module; and
a transmit disable line coupled to each optic module, wherein a transmit disable line connects to each optic module and to the shared host;
wherein an address of at least one optic module is selectively configured from a standard address to a unique address by selectively disabling all but one shared bus interface by sending a disable signal on the transmit disable line to disable every shared bus interface except for the shared bus interface of the optic module having its standard address chanced to a unique address.

15. The assembly of claim 14, wherein each optic module further comprises memory configured to store a module address and transmit disable line status.

16. The assembly of claim 15, wherein the transmit disable line status comprises a register value, wherein the register value controls communication with a module via the shared bus.

17. The assembly of claim 14, wherein each optic module further comprises memory and the host comprises a personal computer configured to read and write to a particular optic module memory via the shared bus using a unique address associated with a particular optic module.

* * * * *